(12) United States Patent
Okuyama (10) Patent No.: US 7,706,022 B2
(45) Date of Patent: Apr. 27, 2010

(54) IMAGE FORMING APPARATUS AND IMAGE FORMING METHOD

(75) Inventor: Hiroyuki Okuyama, Mishima (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 960 days.

(21) Appl. No.: 11/451,524

(22) Filed: Jun. 12, 2006

(65) Prior Publication Data

US 2007/0285525 A1    Dec. 13, 2007

(51) Int. Cl.
*H04N 1/40* (2006.01)
(52) U.S. Cl. .................. 358/2.1; 358/530; 358/3.23
(58) Field of Classification Search .................. 358/2.1, 358/1.9, 516–520, 504, 529–530, 448, 461, 358/3.23
See application file for complete search history.

(56) References Cited

U.S. PATENT DOCUMENTS

| 6,204,934 | B1 * | 3/2001 | Minamino .................. 358/1.9 |
| 6,370,278 | B1 * | 4/2002 | Waguri ....................... 382/266 |
| 6,989,839 | B2 * | 1/2006 | Braun et al. ................. 345/591 |
| 2005/0275856 | A1 | 12/2005 | Oki |
| 2007/0296985 | A1 * | 12/2007 | Ernst et al. ................... 358/1.9 |

FOREIGN PATENT DOCUMENTS

| CN | 1722774 | 1/2006 |
| JP | 2004-120566 | 4/2004 |

* cited by examiner

*Primary Examiner*—Thomas D Lee
*Assistant Examiner*—Stephen M Brinich
(74) *Attorney, Agent, or Firm*—Turocy & Watson, LLP (57) ABSTRACT

An image forming apparatus according to the invention is characterized by including; an input unit that inputs first color data; a first color converting unit that converts the first color data into a black single color data; a second color converting unit that converts the first color data into second color data; a brightness correcting unit that corrects brightness of the black single color data such that brightness of the black single color data converted by the first color converting unit is equal to brightness of the second color data converted by the second color converting unit; and an image forming unit that prints image data on a recording medium. According to the image forming apparatus, in the image forming apparatus that uses both color conversion processing and black conversion processing, even if image data continuously changes from a chromatic color to an achromatic color, it is possible to reduce "brightness discontinuity".

8 Claims, 6 Drawing Sheets

BRIGHTNESS CORRECTION CURVE
OF BRIGHTNESS CONVERTING UNIT

IMAGE FORMING APPARATUS AND IMAGE FORMING METHOD

BACKGROUND OF THE INVENTION

1. Field of the Invention

The present invention relates to an image forming apparatus and an image forming method, and, more particularly to an image forming apparatus and an image forming method for printing color data using plural color components including black.

2. Description of the Related Art

In image forming apparatuses such as a digital color multi-function peripheral (hereinafter referred to as digital color MFP) and a color printer, a form of performing printing (image formation) using a color component of black (K) in addition to plural color components of yellow (Y), magenta (M), and cyan (C) is often used.

In the image forming apparatuses of this form, a method of determining presence or absence of achromatic color data included in color data read by a scanner unit of the digital color MFP and color data inputted to the color printer from a personal computer or the like and printing an area, which is determined to be of achromatic color data, with a single color of black (K) rather than a combination of the plural colors is often used.

On the other hand, concerning color data that is not an achromatic color (i.e., chromatic color data), first color data (e.g., red (R), green (G), and blue (B)) is replaced with second color data (e.g., yellow (Y), magenta (M), cyan (C), and black (K)).

In this color conversion processing, the color conversion processing is performed according to a method corresponding to a printing object such as a method of preserving brightness (i.e., a method of prioritizing reproducibility of brightness) or a method of emphasizing chroma and contrast.

In the determination of presence or absence of achromatic color data (hereinafter referred to achromatic color determination), usually, determination using a predetermined threshold is performed. Therefore, data determined as achromatic color data includes not only true achromatic colors but also chromatic colors extremely close to the achromatic colors (hereinafter referred to as semi-achromatic colors).

Conventionally, when achromatic color or semi-achromatic color data is converted into a single color of black (K) (this conversion is hereinafter referred to as black conversion processing), only the method of preserving brightness is used.

Therefore, when color conversion is performed using the method of preserving brightness as the color conversion processing, for example, it is possible to realize continuous smooth brightness change for a gradation image that continuously changes from a chromatic color to an achromatic color. However, when color conversion is performed using the method of emphasizing chroma and contrast as the color conversion processing, preserving of brightness is not guaranteed. Thus, there is a problem in that discontinuity of brightness (hereinafter sometimes referred to as "brightness discontinuity") occurs in a boundary of an area subjected to the color conversion processing and an area subjected to black conversion processing.

SUMMARY OF THE INVENTION

The invention has been devised in view of the circumstances and it is an object of the invention to provide an image forming apparatus and an image forming method that use both the color conversion processing and the black conversion processing, the image forming apparatus and the image forming method being capable of reducing "brightness discontinuity" even in image data that continuously changes from a chromatic color to an achromatic color.

In order to attain the object, an image forming apparatus according to an aspect of the invention is characterized by including: an input unit that inputs first color data; a first color converting unit that converts the first color data into a black single color data; a second color converting unit that converts the first color data into second color data; a brightness correcting unit that corrects brightness of the black single color data such that brightness of the black single color data converted by the first color converting unit is equal to brightness of the second color data converted by the second color converting unit; and an image forming unit that prints image data on a recording medium.

In order to attain the object, an image forming method according to another aspect of the invention is characterized by including: an input step of inputting first color data; first color converting step of converting the first color data into black single color data; a second color converting step of converting the first color data into second color data; a brightness correcting step of correcting brightness of the black single color data such that brightness of the black single color data is equal to brightness of the second color data; and an image forming step of printing image data on a recording medium.

DETAILED DESCRIPTION OF THE PREFERRED EMBODIMENTS

An embodiment of an image forming apparatus and an image forming method according to the invention will be explained with reference to the accompanying drawings.

(1) Structure of the Image Forming Apparatus

Figure 1:
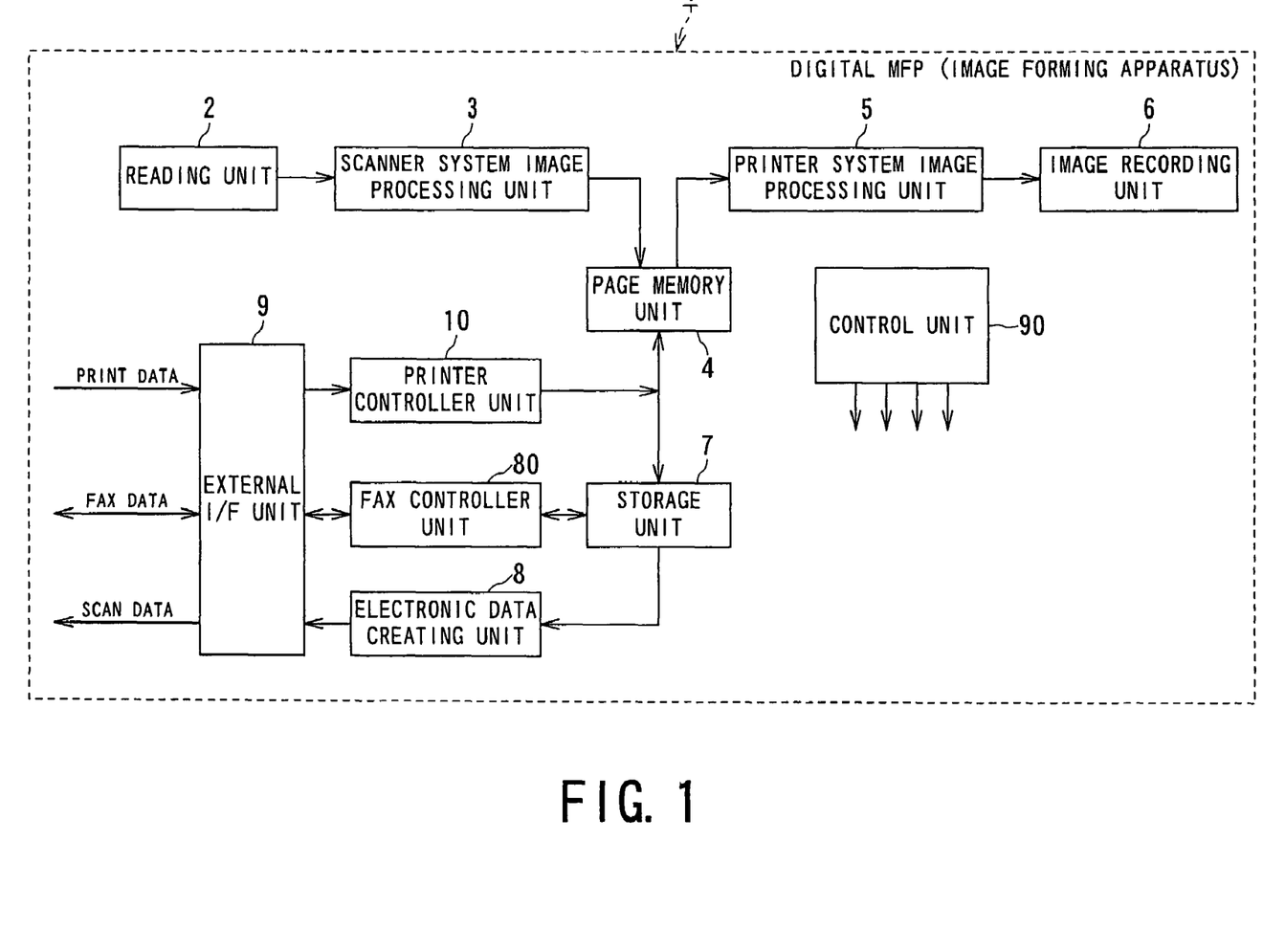
FIG. 1 is a diagram showing an example of an overall structure of an image forming apparatus according to an embodiment of the invention.

FIG. 1 is a diagram showing an example of a system structure of an image forming apparatus 1 that is an embodiment of the invention, for example, a digital MFP (Digital Multi-Function Peripheral).

This image forming apparatus 1 functions as a digital color multi-function peripheral. For example, a copy function, a printer function, a scanner function, a FAX function, a storage function, and the like are realized.

The image forming apparatus 1 includes a reading unit 2, a scanner system image processing unit 3, a page memory unit 4, a printer system image processing unit 5, and an image recording unit 6 and realizes the copy function with these components.

The reading unit 2 optically reads an original with, for example, a three-line CCD sensor and converts the original into color digital image data of red (R), green (G), and blue (B).

The scanner system image processing unit 3 performs various kinds of image processing such as shading correction for correcting non-uniformity of a signal level in a main scanning direction and space filtering processing.

When the image forming apparatus 1 functions as the copy function, the image forming apparatus 1 converts three primary colors of R, G, and B into, for example, color signals of cyan (C), magenta (M), yellow (Y), and black (K) and outputs the color signals to the page memory unit 4. On the other hand, when the image forming apparatus 1 functions as the scanner function, the image forming apparatus 1 outputs the three primary colors of R, G, and B to the page memory unit 4.

The page memory unit 4 temporarily stores image data, for example, in page units and outputs the image data to the printer system image processing unit 5.

The printer system image processing unit 5 applies image processing for printing, for example, γ correction processing and gradation processing to the image data outputted from the page memory unit 4 and outputs the image data to the image recording unit 6.

The image recording unit 6 is a component that prints an image on a recording sheet in, for example, the electrophotographic system and includes an exposure device, a photosensitive drum, a developing device, and the like (all of which are not shown in the figure).

The image forming apparatus 1 includes a storage unit 7, an electronic data creating unit 8, an external I/F unit 9, a printer controller unit 10, and a FAX controller unit 80. These components are used to cause the image forming apparatus 1 to operate as the printer function, the scanner function, the FAX function, the storage function, or the like.

The storage unit 7 is constituted by, for example, an HDD (Hard Disk Drive) and stores image data read by the reading unit 2 and image data inputted from a personal computer or the like on the outside.

It is possible to read out the image data stored in the storage unit 7 as required and print the image data with the image recording unit 6 or output the image data to the outside as scan data.

In causing the image forming apparatus 1 as the scanner function, the electronic data creating unit 8 converts image data into a predetermined data format to generate scan data. The scan data generated is outputted to the outside via the external I/F unit 9.

The FAX controller unit 80 causes the image forming apparatus 1 to operate as the FAX function. The FAX controller unit 80 converts image data read by the reading unit 2 into a data format for FAX and outputs the image data to a telephone line on the outside via the external I/F unit 9. The FAX controller unit 80 converts FAX data inputted from the telephone line into image data and serves the image data for printing in the image recording unit 6.

In causing the image forming apparatus 1 to operate as the printer function, the printer controller unit 10 performs various kinds of control and various kinds of processing required for the print function.

The control unit 90 performs control for the entire image forming apparatus 1.

Image processing according to the invention is image processing of content related to the print function and is realized mainly by the printer controller unit 10. Thus, in the following description, a detailed structure of the printer controller unit 10 and operations thereof will be explained.

Figure 2:
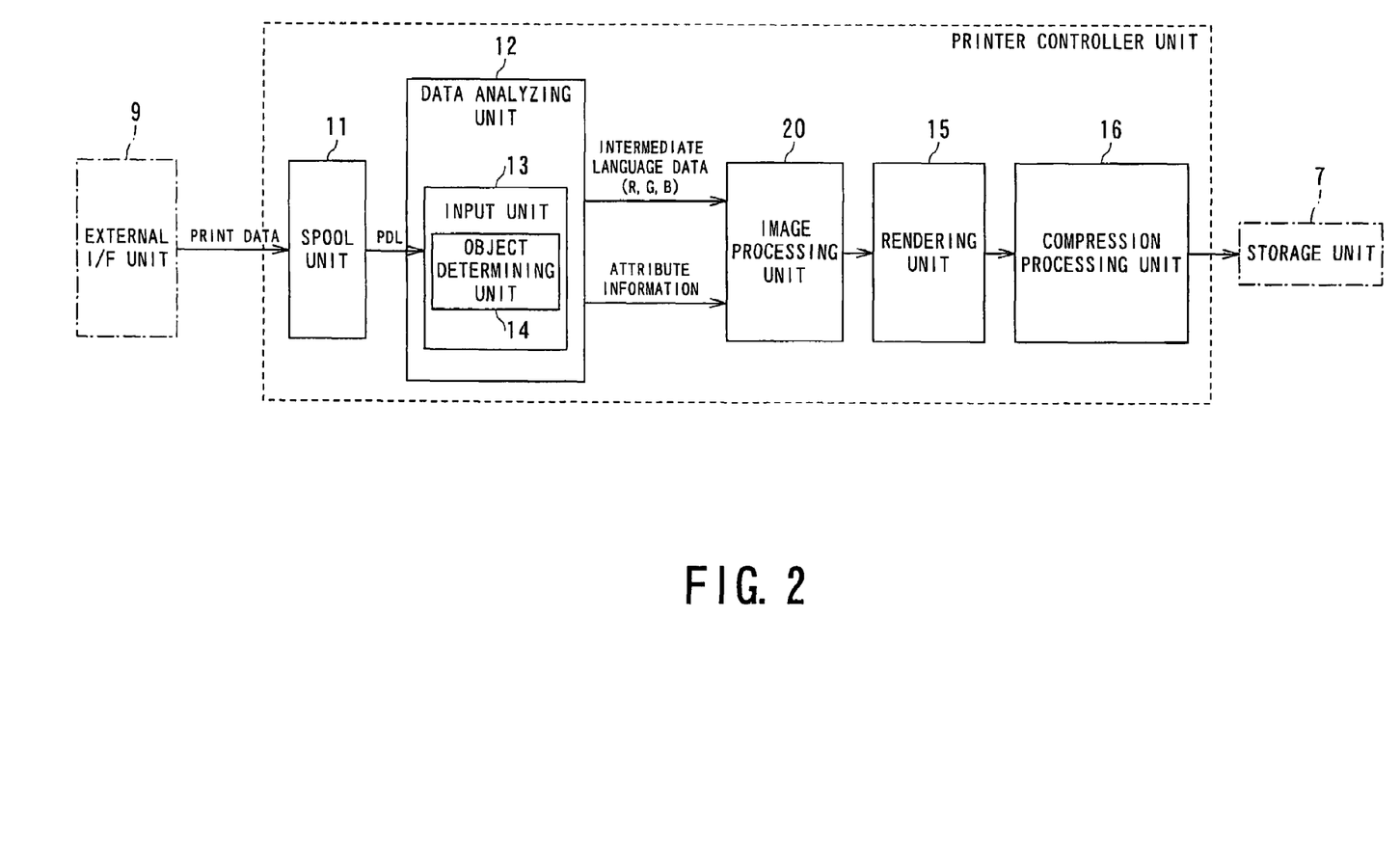
FIG. 2 is a diagram showing an example of a structure of a printer control unit according to the embodiment.

FIG. 2 is a diagram showing an example of the detailed structure of the printer controller unit 10.

The printer controller unit 10 includes a spool unit 11, a data analyzing unit 12, an image processing unit 20, a rendering unit 15, and a compression processing unit 16.

Print data inputted from an external apparatus such as a personal computer is inputted to the printer controller unit 10 via the external I/F unit 9 and temporarily stored in the spool unit 11.

The print data is usually inputted from the external apparatus in a form of page description language data (PDL). This page description language is inputted to an input unit (inputting means) 13 of the data analyzing unit 12.

An object determining unit (object determining means) 14 included in the input unit 13 analyzes a language described in the PDL, determines an object included in attribute information, and generates an intermediate language data forming a pair with the language.

The attribute information is information indicating a type of an object in a document and a position of the object. The object indicates a type of an element of document data and is, for example, a "character object", a "graphic object", an "image object", or the like. The intermediate language data is data mainly indicating color information and is, for example, information indicating respective levels of red (R), green (G), and blue (B) with values in a range of 0 to 255, respectively.

These intermediate language data and attribute information are inputted to the image processing unit 20 from the data analyzing unit 12.

The image processing unit 20 mainly performs color conversion processing. In general, color information inputted from the personal computer or the like is in a form of three primary color data of R, G, and B (first color data). The image processing unit 20 converts the three primary color data into color data for printing (second color data), for example, four color data of cyan (C), magenta (M), yellow (Y), and black (K) for each object.

In this embodiment, as described later, the image processing unit 20 performs processing for applying achromatic color determination to inputted image data (three primary color data of R, G, and B), applying black conversion processing by a black single color rather than the four colors of cyan (C), magenta (M), yellow (Y), and black (K) to an area determined as an achromatic color, and combining the image data with an image after color conversion of a chromatic color area to generate combined image data.

The combined image data generated by the image processing unit 20 is converted into so-called raster image data (data represented by arrangement of colored dots) in the rendering unit 15 at the next stage.

This raster image is subjected to data compression by the compression processing unit 16 and temporarily stored in the storage unit 7. Thereafter, the raster image is transferred to the print system signal processing unit 5 (see FIG. 1) via the page memory unit 4, restored to the original raster image data (data expansion) in the printer system signal processing unit 5, and subjected to image processing for printing such as gradation processing.

Finally, in the image recording unit 6, a print image is formed on a recording medium such as a recording sheet.

(2) Structure and Operations of the Image Processing Unit

Figure 3:
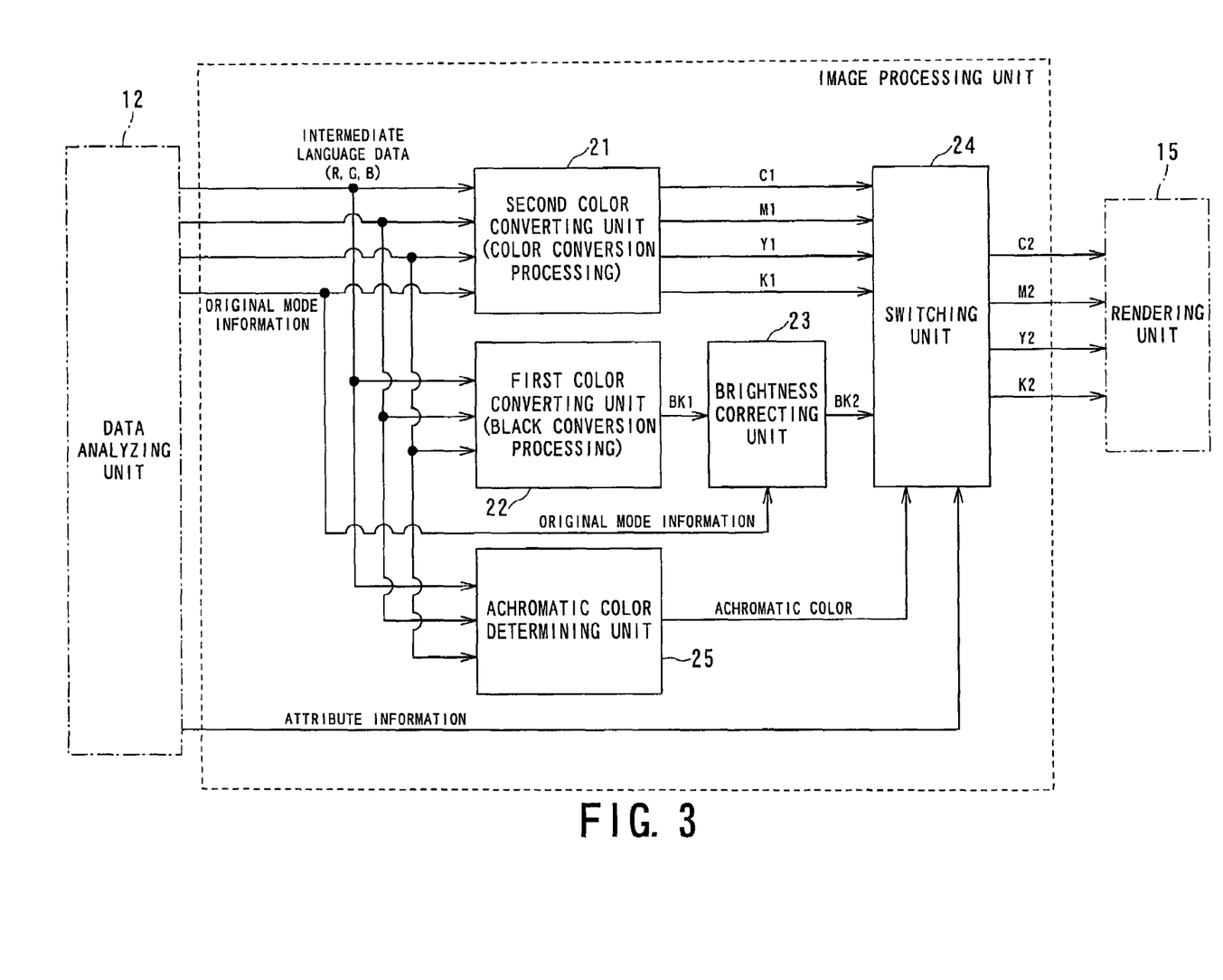
FIG. 3 is a diagram showing an example of a structure of an image processing unit according to the embodiment.

FIG. 3 is a diagram showing an example of a detailed structure of the image processing unit 20 according to this embodiment.

The image processing unit 20 includes a second color converting unit (second color converting means) 21 that performs color conversion processing for converting first color data into second color data, a first color conversion processing unit (first color conversion processing means) 22 that performs black conversion processing, a brightness correcting unit (brightness correcting means) 23 that corrects brightness of image data subjected to black conversion, an achromatic color determining unit (achromatic color determining means) 25 that applies achromatic color determination to the first color data, and a switching unit (switching means) 24 that switches an output of the second color converting unit 21 and an output of the brightness correcting unit 23.

The achromatic color determination will be explained. In color data inputted to the achromatic color determining unit 25 as the first color data, respective level values of R, G, and B are often defined as values in a range of 0 to 255. In this embodiment, the first color data is also treated as complying with this definition.

In this embodiment, a method of the achromatic color determination is not specifically limited. However, for example, color data is determined as that of an achromatic color when all of the following three expressions are satisfied.

$$|R-G|<T1 \quad \text{(Expression 1)}$$

$$|G-B|<T2 \quad \text{(Expression 2)}$$

$$|B-R|<T3 \quad \text{(Expression 3)}$$

On the other hand, when any one of (Expression 1) to (Expression 3) is not satisfied, it is determined that color data is not of an achromatic color (is a chromatic color). T1, T2, and T3 are thresholds appropriately set.

Theoretically, in a true achromatic color, an R value, a G value, and a B value are identical values (R=G=B). However, for example, when an original of gray (a true achromatic color) is read by a scanner or the like, an R value, a G value, and a B value are not completely identical values because of an error or the like of hardware and have a little variation in some cases. Thus, in determining whether an R value, a G value, and a B value are identical, an allowance defined by the thresholds T1, T2, and T3 is given to the determination.

As a result, colors determined as achromatic colors include not only true achromatic colors but also chromatic colors close to the achromatic colors (semi-achromatic colors).

When a color is determined as an achromatic color, for example, an "achromatic color flag" is set to "1" and outputted from the achromatic color determining unit 25. When a color is determined as a chromatic color, the "achromatic color flag" is set to "0" and outputted from the achromatic color determining unit 25.

The black conversion processing performed in the first color conversion processing unit 22 will be explained. In the first color conversion processing unit 22, for example, a BK1 value of black single color data is calculated from an R value, a G value, and a B value of the first color data using the following (Expression 4) and (Expression 5).

$$Y=\alpha \cdot R+\beta \cdot G+\gamma \cdot B \quad \text{(Expression 4)}$$

$$BK1=255-Y \quad \text{(Expression 5)}$$

where $\alpha=0.30$, $\beta=0.59$, and $\gamma=0.11$.

(Expression 4) is an expression for approximately converting the R value, the G value, and the B value into brightness Y. In the case of white (R=G=B=255), Y=255. In the case of black (R=G=B=0), Y=0. In an achromatic color (gray) other than white and black and a chromatic color, Y takes a median value between 0 and 255.

(Expression 5) is an expression for approximately converting the brightness Y into a density value of black single color data (BK1 value). In the case of white, the density value is minimum density (BK1=0). In the case of black, the density value is maximum density (BK1=255). In gray and a chromatic color, BK1 takes a median value between 0 and 255.

In (Expression 5), the BK1 value is represented as "density" of a print color. However, it is also possible to treat the BK1 value as "brightness" of black single color data. In this case, a brightness BK1' value is represented by (Expression 6).

$$BK1'=255-BK1=Y \quad \text{(Expression 6)}$$

BK1' is exactly the brightness Y calculated by (Expression 4).

As it is seen from (Expression 5) or (Expression 6), in the black conversion processing, an R value, a G value, and a B value inputted are converted into the brightness Y such that black single color data of the brightness BK1' value (or the density BK1 value) has a linear relation with the converted brightness value Y and the converted brightness value Y is maintained through the conversion. Therefore, the converted brightness value can be faithfully reproduced.

"Brightness discontinuity" that occurs when the second color data (C, M, Y, and K) and black single color data are combined will be explained.

In the second color converting unit 21, color conversion processing for converting the first color data (R, G, and B) into the second color data (C, M, Y, and K) is performed. In this color conversion processing, usually, the second color converting unit 21 has plural kinds of color conversion modes in association with various "modes of original" set by a user.

For example, the second color converting unit 21 has a "brightness priority mode", a "chroma emphasis mode", a "contrast emphasis mode", and the like as the color conversion modes.

The "brightness priority mode" is a mode for faithfully preserving brightness of an R value, a G value, and a B value inputted and converting the brightness into a C value, an M value, a Y value, and a K value.

The "chroma emphasis mode" is a mode for converting an R value, a G value, and a B value into a C value, an M value, a Y value, and a K value to emphasize chroma. As a result, brightness by the R value, the G value, and the B value before conversion (hereinafter referred to as input brightness) and brightness by the C value, the M value, the Y value, and the K value after conversion (hereinafter referred to as output brightness) are usually different.

The "contrast emphasis mode" is a mode for converting an R value, a G value, and a B value into a C value, an M value, a Y value, and a K value to emphasize contrast. In this case, input brightness and output brightness are also usually different.

Figure 4A:
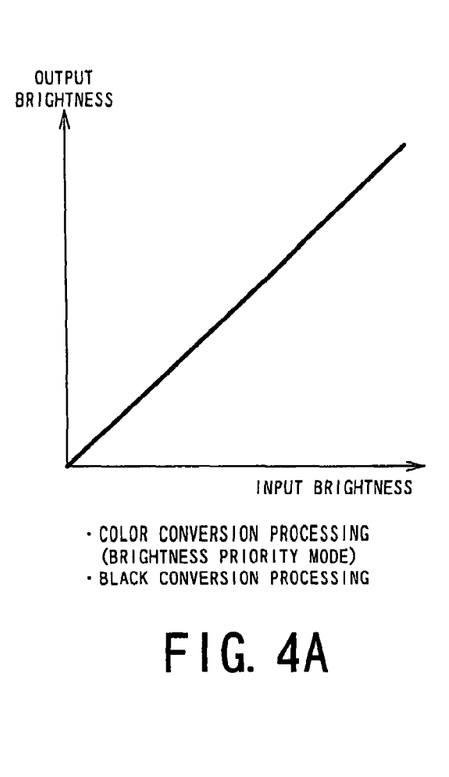
FIG. 4A is a diagram showing an example of an input/output relation of brightness of color conversion processing in a brightness priority mode and black conversion processing.

FIG. 4A is a diagram schematically showing a relation between input brightness and output brightness in the case in which a color conversion mode of the color conversion processing is the "brightness priority mode". The "brightness priority mode" is a mode for performing conversion such that brightness before conversion and brightness after conversion coincide with each other. As shown in FIG. 4A, the input brightness and the output brightness are in a one-to-one linear relation.

As described above, the black conversion processing is conversion performed such that brightness before conversion and brightness after conversion usually coincide with each other. A relation between input brightness and output brightness is a relation shown in FIG. 4A.

Figure 4B:
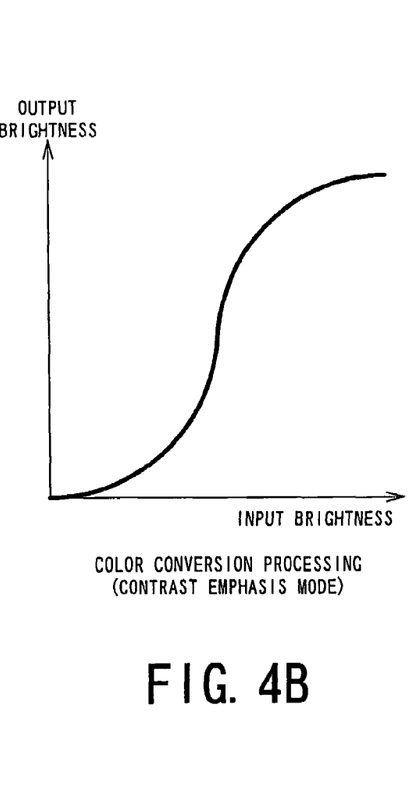
FIG. 4B is a diagram showing an example of an input/output relation of brightness of color conversion processing in a contrast emphasis mode.

FIG. 4B is a diagram schematically showing a relation between input brightness and output brightness in the case in which a color conversion mode of the color conversion processing is the "contrast emphasis mode". The "contrast emphasis mode" is a mode for positively emphasizing contrast after conversion. Therefore, naturally, the input brightness and the output brightness do not coincide with each other. For example, the input brightness and the output brightness are in an S-shape non-linear relation shown in FIG. 4B.

Figure 4C:
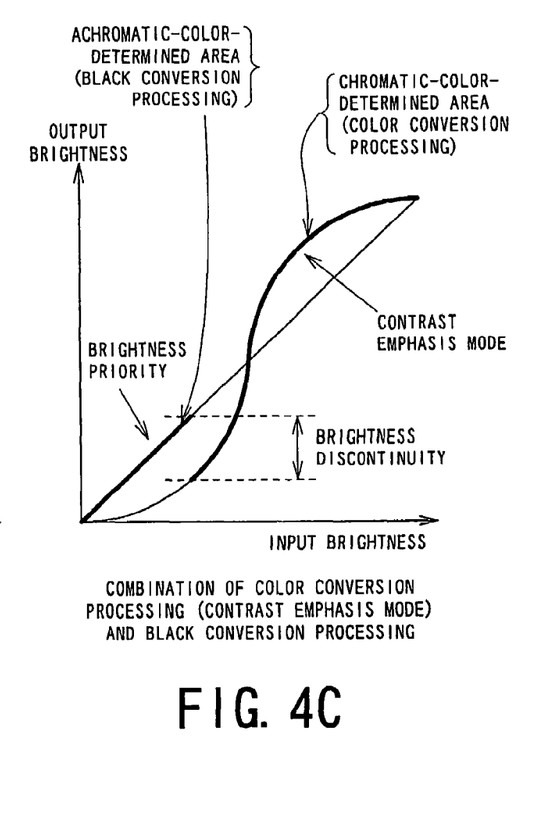
FIG. 4C is a diagram for explaining a "brightness discontinuity" phenomenon that occurs when a color conversion processing image and a black conversion processing image are simply combined.

FIG. 4C is a diagram for explaining a "brightness discontinuity" phenomenon that occurs when the second color data subjected to the color conversion processing and an image subjected to the black conversion processing are simply combined.

This simple combination is realized in the switching unit 24 such that, in the area determined as an achromatic color, the black single color data BK1 which is outputted from the first color conversion processing unit 22 is switched out, while in the area determined as an chromatic color, the second color data C1, M1, Y1, and K1 which are outputted from the second color converting unit 21 are switched out.

In this simple combination, when the color conversion processing selects a color conversion mode in which input brightness and output brightness are inconsistent such as the "contrast emphasis mode", "brightness discontinuity" shown in FIG. 4C occurs in a boundary between the chromatic-color-determined area and the achromatic-color-determined area.

Thus, in this embodiment, the brightness correcting unit 23 that corrects brightness of the black single color data BK1 is provided between the first color conversion processing unit 22 and the switching unit 24 to eliminate "brightness discontinuity" with this brightness correcting unit 23.

Figure 5:
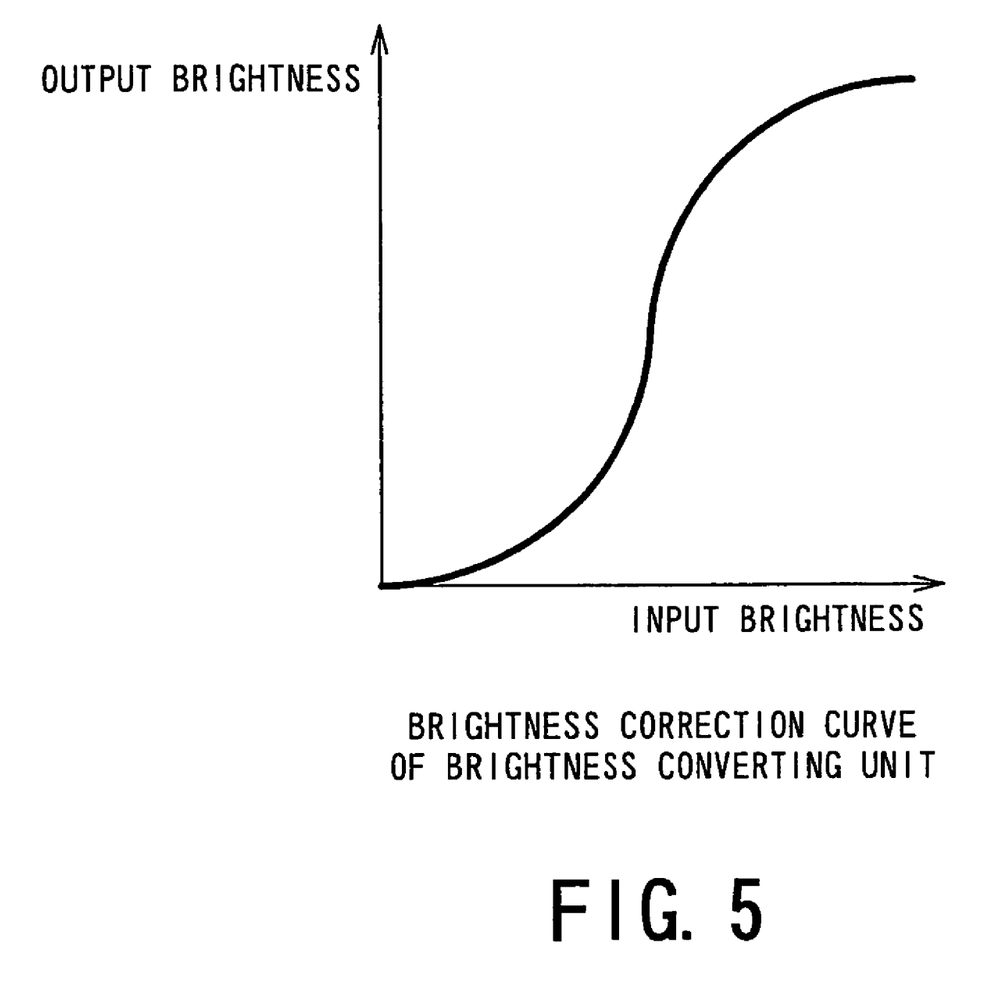
FIG. 5 is a diagram showing an example of a brightness correction curve according to the embodiment.

Specifically, the black single color data BK1 (input brightness of a correction curve) is corrected according to a correction curve shown in FIG. 5 as an example. Black single color data BK2 after correction (output brightness by the correction curve) is outputted to the switching unit 24.

In this case, the correction curve held by the brightness correcting unit 23 is provided to coincide with input brightness and output brightness of the color conversion processing performed by the second color converting unit 21.

According to this correction curve, it is possible to make brightness of the black single color data BK2 after correction and brightness of the second color data C1, M1, Y1, and K1 identical, thus resulting in eliminating "brightness discontinuity" in the image data C2, M2, Y2, and K2 outputted by switching these two data from the switching unit 24.

It is possible to realize the correction curve in the brightness correcting unit 23 using, for example, a lookup table. Output brightness may be calculated using an arithmetic expression for approximating the correction curve.

A relation between input brightness and output brightness of the color conversion processing performed by the second color converting unit 21 is different depending on a color conversion mode. For example, in the "contrast emphasis mode", the relation is a relation between input brightness and output brightness of a shape shown in FIG. 4B as an example. In the "chroma emphasis mode", the relation is a relation different from this shape. In this situation, plural kinds of correction curves corresponding to color conversion modes of the color conversion processing only have to be provided in the brightness correcting unit 23 to switch a type of the correction curve according to a color conversion mode.

In the above explanation, the switching unit 24 switches the black single color data BK2 after correction and the second color data C1, M1, Y1, and K1 on the basis of a result of the achromatic color determination. However, the switching unit 24 may switch the black single color data BK2 after correction and the second color data C1, M1, Y1, and K1 taking into account object information (attribute information) of image data in addition to a result of the achromatic color determination.

Figure 6:
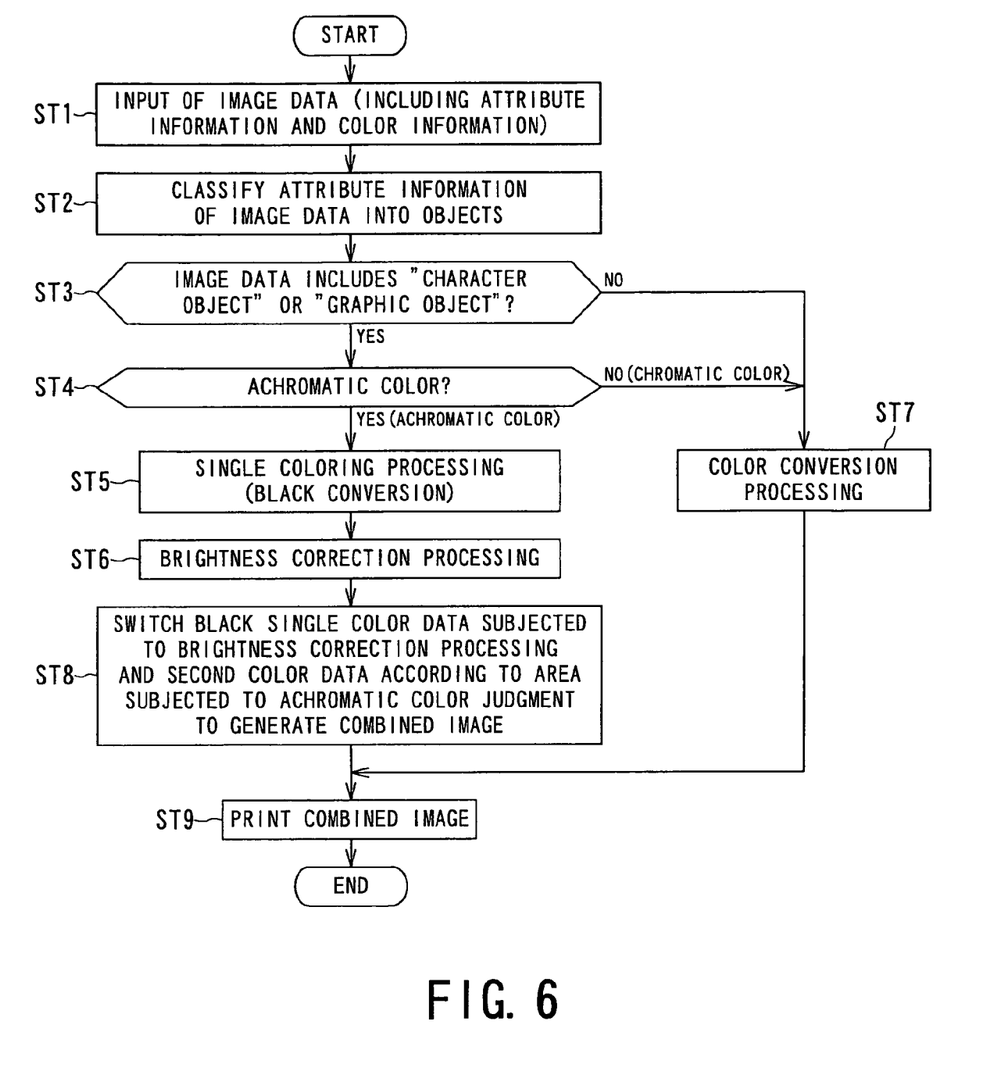
FIG. 6 is a flowchart showing an example of an image forming method according to the embodiment.

FIG. 6 is a flowchart showing an example of an image forming method according to this embodiment and shows an example of processing using both a result of the achromatic color determination and object information.

First, in step ST1, image data (first color data) including attribute information and color information is inputted.

In step ST2, the attribute information of the image data inputted is classified into objects. For example, the attribute information is classified into a "character object", a "graphic object", an "image object", and the like.

In step ST3, it is determined whether the image data inputted includes the "character object" or the "graphic object". When the image data includes the "character object" or the "graphic object", the processing proceeds to step ST4. On the other hand, when the image data inputted does not include the "character object" or the "graphic object", for example, when the image data includes only the "image object", the processing proceeds to step ST7.

In the first place, one of aims of converting an achromatic color determination area to be black single color data is economy from the viewpoint of ink usage and to clearly represent characters and graphics of an achromatic color with a pure black single color ink. Therefore, there is little advantage in applying the achromatic color determination to the "image object" such as a color photograph and printing the "image object" in a black single color. Thus, in this embodiment, in step ST3, objects subjected to the achromatic color determination are limited to the "character object" or the "graphic object".

In step ST4, the achromatic color determination is performed. This achromatic color determination is performed on the basis of, for example, (Expression 1) to (Expression 3) described above.

In the next step ST5, single coloring processing, that is, black conversion processing is performed. This black color processing is performed on the basis of, for example, (Expression 4) and (Expression 5) described above.

In step ST6, brightness correction processing is performed. This brightness correction processing is, as described above, processing for correcting brightness of black single color data after the black conversion processing to be equal to brightness of the second color data.

On the other hand, the usual color conversion processing is applied to an object that is determined not to be the "character object" or the "graphic object" in step ST3 or image data determined to be a chromatic color in step ST4. The first color data (R, G, and B) is converted into the second color data "C1, M1, Y1, and K1) (step ST7). At this point, a color conversion mode corresponding to a "mode of original" set by the user is selected to perform the color conversion processing.

In step ST8, the black single color data BK2 subjected to the brightness correction processing and the second color data (C1, M1, Y1, and K1) are switched according to an area subjected to the achromatic color determination to be combined as image data (C2, M2, Y2, and K2).

Finally, a combined image is printed by the image recording unit 6 (step ST9).

As explained above, according to the image forming apparatus 1 and the image forming method according to this embodiment, in the image forming apparatus that uses both the color conversion processing and the black conversion processing, brightness of image data after the black conversion processing is corrected to coincide with brightness of image data after the color conversion processing. Thus, even if image data continuously changes from a chromatic color to an achromatic color, it is possible to reduce discontinuity of brightness ("brightness discontinuity") that occurs conventionally.

The invention is not limited to the embodiment itself. At an implementation stage, it is possible to modify and embody the elements without departing from the spirit of the invention. It is possible to form various inventions according to appropriate combinations of the plural elements disclosed in the embodiment. For example, some elements may be deleted from all the elements described in the embodiments. Moreover, elements in different embodiments may be appropriately combined.

What is claimed is:

1. An image forming apparatus comprising:
an input unit configured to input first color data;
a first color converting unit configured to convert the first color data into black single color data;
a second color converting unit configured to convert the first color data into second color data;
a brightness correcting unit configured to correct brightness of the black single color data such that brightness of the black single color data converted by the first color converting unit is equal to brightness of the second color data converted by the second color converting unit;
an image forming unit configured to print image data on a recording medium;
an achromatic color determining unit configured to determine whether achromatic color data is included in the first color data; and
a switching unit configured to output, when it is determined by the achromatic color determining unit that achromatic color data is included, the black single color data, brightness of which is corrected by the brightness correcting unit, to the image forming unit as the image data and output, when it is determined by the achromatic color determining unit that achromatic color data is not included, the second color data to the image forming unit as the image data.

2. An image forming apparatus according to claim 1, wherein the brightness correcting unit corrects brightness of the black single color data according to a lookup table.

3. An image forming apparatus according to claim 1, wherein the second color converting unit is configured to be capable of converting a color according to at least one of a method of converting a color giving higher priority to emphasis of chroma than coincidence of brightness and a method of converting a color giving higher priority to emphasis of contrast than coincidence of brightness in addition to a method of converting the first color data such that brightness of the first color data and brightness of the second color data are equal.

4. An image forming apparatus according to claim 1, wherein
the input unit includes an object determining unit configured to determine whether an "object" of the first color data is at least anyone of a "character object", a "graphic object", and an "image object", and
the switching unit outputs, when it is determined by the object determining unit that the "object" of the first color data is the "character object" or the "graphic object" and it is determined by the achromatic color determining unit that achromatic data is included, the black single color data, brightness of which is corrected by the brightness correcting unit, to the image forming unit as the image data.

5. An image forming method comprising:
inputting first color data;
converting the first color data into black single color data;
converting the first color data into second color data;
correcting brightness of the black single color data such that brightness of the black single color data is equal to brightness of the second color data;
printing image data on a recording medium;
determining whether achromatic color data is included in the first color data; and
outputting, when it is determined in the achromatic color determining step that achromatic color data is included, the black single color data, brightness of which is corrected in the brightness correcting step, as the image data and outputting, when it is determined in the achromatic color determining step that achromatic color data is not included, the second color data as the image data.

6. An image forming method according to claim 5, wherein, in correcting brightness, brightness of the black single color data is corrected according to a lookup table.

7. An image forming method according to claim 5, wherein, in converting the first color data into second color data, a color is converted according to at least one of a method of converting a color giving higher priority to emphasis of chroma than coincidence of brightness and a method of converting a color giving higher priority to emphasis of contrast than coincidence of brightness in addition to a method of converting the first color data such that brightness of the first color data and brightness of the second color data are equal.

8. An image forming method according to claim 5, wherein
the step of inputting includes a step of determining whether an "object" of the first color data is at least any one of a "character object", a "graphic object", and an "image object", wherein
in the step of outputting, the black single color data, brightness of which is corrected in the brightness correcting step, is outputted as the image data when it is determined in the object determining step that the "object" of the first color data is the "character object" or the "graphic object" and it is determined in the achromatic color determining step that achromatic data is included.

* * * * *